United States Patent [19]

Nawracaj

[11] 4,042,724
[45] Aug. 16, 1977

[54] METHOD FOR THE SELECTIVE ON-LINE MEASURING AND CONTROLLING OF A GEOMETRICAL PARAMETER OF ELONGATED ARTICLES

[75] Inventor: Dennis J. Nawracaj, Chicago, Ill.

[73] Assignee: Western Electric Company, Inc., New York, N.Y.

[21] Appl. No.: 535,599

[22] Filed: Dec. 23, 1974

[51] Int. Cl.$^2$ .............................................. B05D 5/00
[52] U.S. Cl. ........................................... 427/9; 118/9
[58] Field of Search .......................... 427/9, 10; 118/9

[56] References Cited

U.S. PATENT DOCUMENTS

| 3,172,779 | 3/1965 | Warshaw et al. | 118/9 |
|---|---|---|---|
| 3,303,044 | 2/1967 | Fenley | 427/10 |
| 3,425,861 | 2/1969 | Jones | 427/9 |
| 3,552,161 | 1/1971 | Garbe et al. | 72/4 |
| 3,700,490 | 10/1972 | Hiyosi et al. | 427/10 |

FOREIGN PATENT DOCUMENTS 230,929   1/1969   U.S.S.R. .................................. 427/9

OTHER PUBLICATIONS

General Electric Qualigraph Instruction Manual GEH 3823, Apr. 1970 (covers and pp. 1–8).

Primary Examiner—Ronald H. Smith
Assistant Examiner—Janyce A. Bell
Attorney, Agent, or Firm—K. R. Bergum; R. P. Miller

[57] ABSTRACT

A method for use in the on-line monitoring of a geometrical parameter of a continuously advancing elongated article and, more particularly, the measuring and controlling of a geometrical dimension of such articles. The method utilizes fluidics to selectively perform such operating functions as signal responsive measuring, comparing, averaging, sensing and controlling, with the apparatus requiring a minimum of circuit interfaces and moving elements. One preferred application of the method is in measuring and controlling the coating thickness of a plurality of pulp insulated wires during manufacture.

13 Claims, 9 Drawing Figures

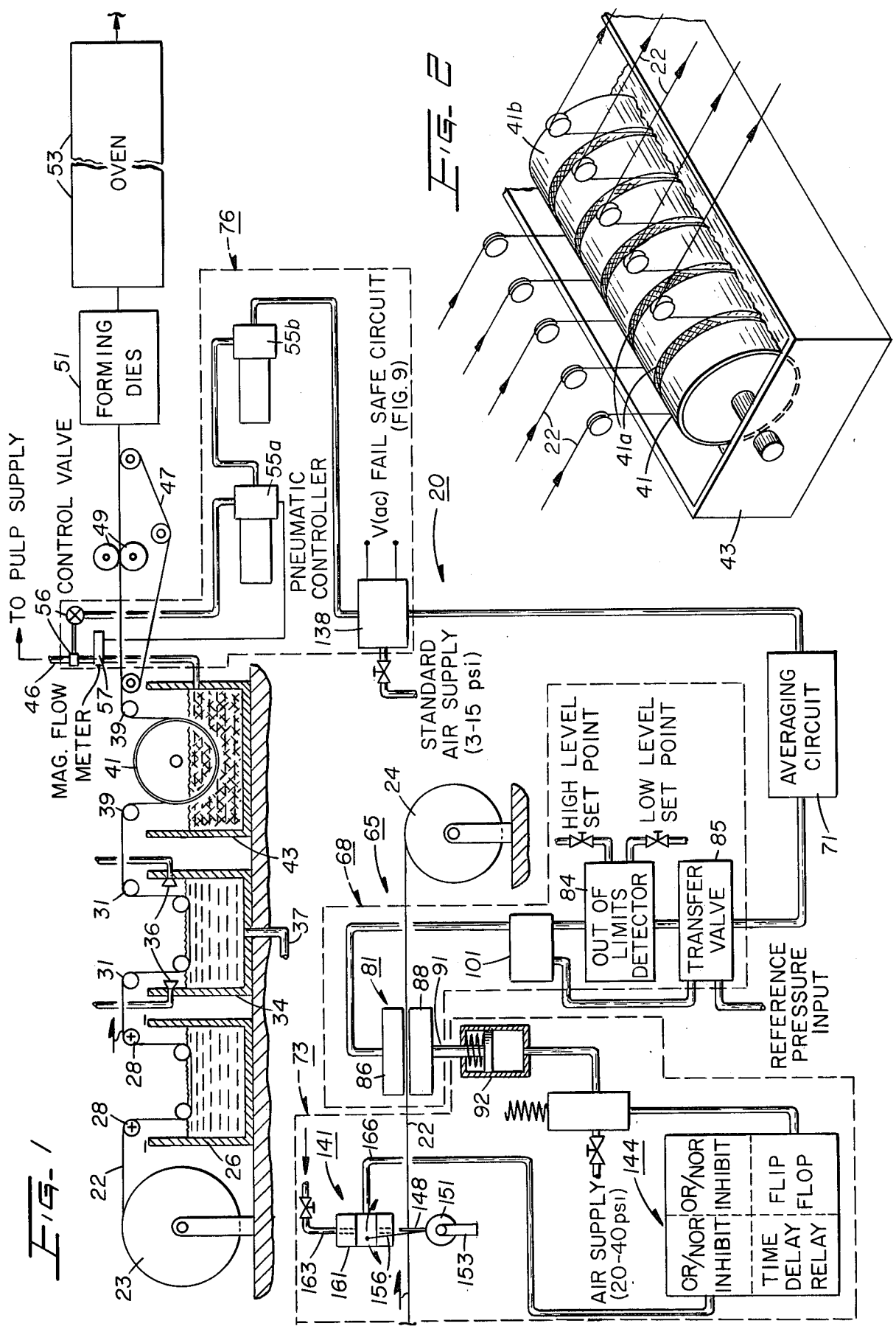

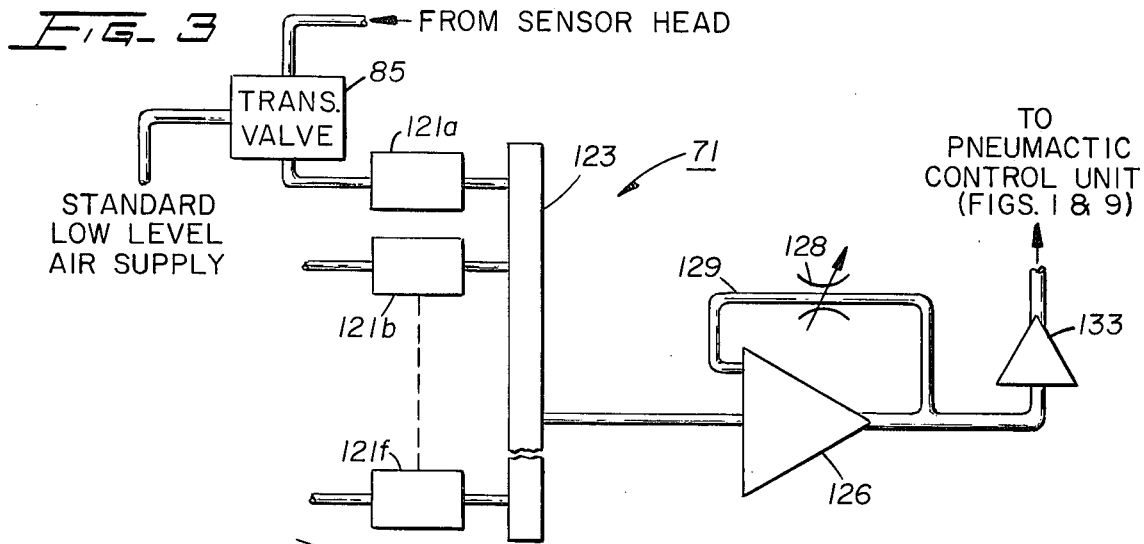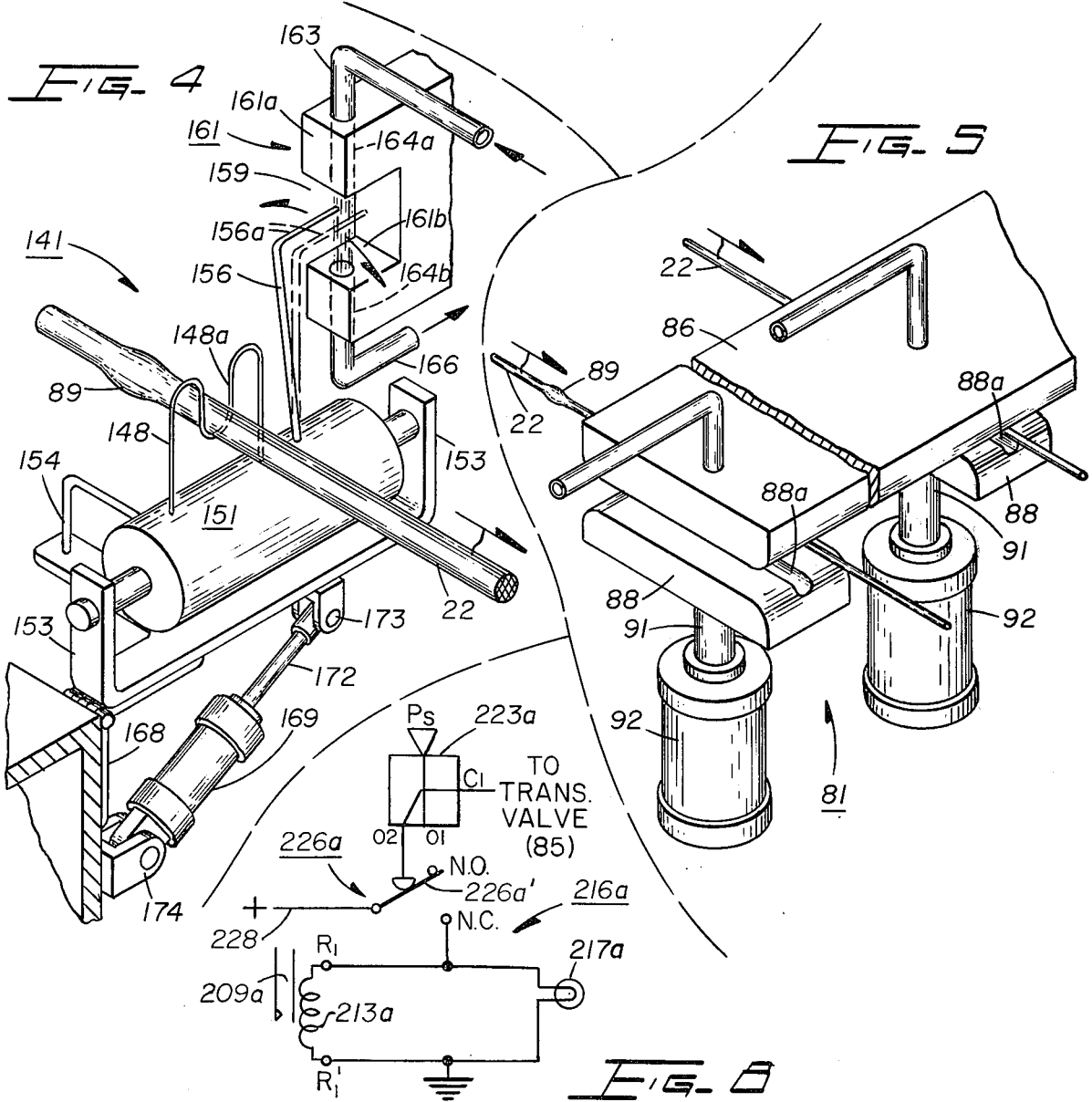

METHOD FOR THE SELECTIVE ON-LINE MEASURING AND CONTROLLING OF A GEOMETRICAL PARAMETER OF ELONGATED ARTICLES

BACKGROUND OF THE INVENTION

1. Field of the Invention

This invention relates generally to the on-line monitoring of a geometrical parameter of a continuously advancing elongated article and, more particularly, to a method of measuring and controlling the thickness of the pulp coating applied to pulp insulated wire.

2. Description of the Prior Art

There have been a number of techniques employed heretofore to measure the thickness of a coating material applied to continuously advancing articles, such as in the form of strip stock material or wire. Such techniques have often involved the use of radiation detectors, as well as mechanical, electro-mechanical an photo-electric devices to sense a change in the thickness of a coating applied to articles of the type in question.

With resepect to radiation detectors, they necessarily have presented problems with resepect to shielding because of their radioactive nature. Such detectors are also normally not optimally effective, and in certain cases may be totaly ineffective, when employed to sense a change in a geometrical parameter, such as the diameter of an article having at least an outer coating in a particular wet, porous state (as distinguished from a hard, smooth and dry state).

As for mechanical and electro-mechanical sensing devices, they often are not capable of sensing or measuring extremely small physical changes in an article, particularly on a continuously monitored basis. This follows from the fact that the pressure switches and/or microswitches typically employed in such measuring apparatus are normally not sensitive to article geometric deviations falling in the range of one to several thousandths of an inch. Moreover, such switches generally have a limited switch contact life, unreliable repeatability over extended periods of use, and a relatively high inherent hysteresis, all of which contribute to the undesirability of using such measuring apparatus in on-line, high volume product manufacture.

As for the use of photo-electric sensors, they normally cannot readily measure geometrical variations in the order of one of several thousandths of an inch, particularly when such variations relate to the cross-section of an article having a curvilinear profile. Even for measuring larger variations, however, photo-electric sensors generally require rather expensive, fragile and complex arrays of miniaturized photo-electric diode matrices, together with complex wiring and logic circuitry to interface with such matrices.

Frequently, of course, the manufacturing area in which the geometrical parameter of an article is to be monitored also presents extreme environmental problems, such as with respect to shock, vibration, high temperature and/or humdity and dust. This often necessitates, in addition to convenience, that the actual processing of the sensor derived signal information take place at a remote location from the work functions being performed on the article. Such signal processing, for example, may include comparing the sensor initiated output signal with a reference signal, so as to determine the magnitude of any error, and thereafter producing a control signal for dynamically controlling some manufacturing process function. Unfortunately, when such low level generated output signals are electrical, and particularly when they comprise an analog representation of the sensed physical parameter (or condition) of an article, they are often subjected to considerable attentuation when transmitted over any appreciable distance. As a result, such low level signals do not always accurately represent the measured parameter because they have a tendency to develop non-linearities and are susceptible to externally induced noise.

A further disadvantage of many prior on-line measuring and control systems has been that they have required one or more interfaces to allow a given parameter, for example, to be sensed mechanically, the logic control functions involved in the measurement to be performed electrically, and the actuating of the control apparatus to be controlled either mechanically or pneumatically. When such multiple interfaces are required, not only is the control system generally more expensive and complex, but it normally requires considerably more space.

It is also appreciated, of course, that the nature of the article, itself, can often present problems with respect to the measuring of a given parameter (or condition) thereof. For example, with respect to transducers or sensors of the mechanical, electro-mechanical and radiation types, the following factors selectively have a bearing on the type of measuring system (including sensor) employed: cross-sectional profile, conductive (or insulative) characteristics, ferromagnetic properties, weight, working temperature, resiliency, and as previously mentioned, porosity and degree of wetness (or dryness), to mention but a few.

Because of the many aforementioned problems that may be selectively encountered in any given on-line measuring and control system, fluidic sensors, such as in the form of mating gauge plates with one or more grooved passageways extending therethrough, have been employed heretofore to sense or measure changes in the diameter or cross-section of an elongated article continuously advanced therethrough. The sensor head has a pre-established fluidic pressure applied thereto through an orifice that communicates with the passageway such that a certain back-pressure is established by the presence of an article when positioned within the passageway. The magnitude of the back-pressure is proportional to the article cross-section along any given discrete axial segment that extends across the internal orifice that communicates with the sensor head passageway.

Such sensor heads have been employed heretofore to continuously monitor variations in yarn denier and fabric porosity in the textile industry, for example, as well as having been proposed and/or used in various selective applications such as in measuring the diameter of finished product, such as wire, cable or other tubular articles of essentially symmetrical cross-section, as well as elongated articles of irregular cross-section, such as rope, braided strands, etc.

While fluidic sensor heads are advantageously immune to at least most environmental conditions, and are quite sensitive to extremely small geometric variations in the elongted article being monitored, they have been limited heretofore to on-line applications where the diameter (or the cross-sectional area) of the measured article passing therethrough does not vary appreciably from both a given nominal diameter (or cross-sectional area), and from the cross-sectional area of the grooved passageway formed in and extending through the sensor head. The reason for this is that should the article develop an abnormally large cross-sectional region along its length, such as due to cobble (oversized joint or over build-up of material) on bare wire or continuously cast or extruded rod stock, or a glob (over build-up of insulation) on a coated wire, such imperfections could not always pass through the sensor head passageway, which is formed by mating, air-tight sealed gauge plates. As a result, eiher the rod stock or wire would break, or a jammed condition would develop whenever a cobble or glob would develop thereon. In either case, there would be a loss of production time required to re-string the wire (or rod) in an on-line manufacturing system. Other obstructions, such as knots in either single strand, or multiple twisted or braided strand, articles would likewise normally not pass through conventional fluidic sensor heads.

A specially designed mechanical apparatus for sensing the presence of cobbles formed on a continuously cast copper rod, together with a control system for interrupting further feed of rod in response to a cobble, is disclosed in U.S. Pat. No. 3,552,161, of H. W. Garbe et al. In that apparatus, the cobble detector actually comprises a pair of scissor type arms, the lower ends of which are formed with semi-circular portions so as to define a substantially enclosing aperture through which the rod passes when of nominal diameter. The upper ends of the pivotally mounted arms are biased against spring-biased plungers of respectively associated microswitches. With such a cobble detector apparatus, the sensing arms necessarily must exert at least a slight tension on the rods whenever a cobble passes through the split aperture, as the pivotal arms must be displaced sufficiently not only to accommodate the cobble, but to actuate one or both of the microswitches.

While such increased tension is normally of no consequence with respect to cast rod stock or large gauge wire, such increased tension may very readily result in the breaking of fine gauge wire, of the order of 18 to 26 gauge typically used in pulp insulated cable.

As a possible alternative approach to obviating the aforementioned problem, there is an automated on-line system disclosed in S. Warsaw et al U.S. Pat. No. 3,172,779, for controlling the thickness of a coating applied to strip material, such as paper, which does not require any of the aforementioned types of geometric measuring sensors and, hence, would also not present any of the problems described above with respect to the sporadic development of globs on pulp coated wire if allowed to advance through the measuring system. In this last mentioned prior control system, relatively complex and expensive recording, signal generating and counting apparatus is employed to quantitatively determine the amount of coating material that is applied to a pre-calculated area of the strip stock. The calculated area is compared in a correlated manner with the measured length of strip stock that is actually advanced within a predetermined period of time. A generated control signal, representative of the difference between the correlated measured and calculated parameters, in accordance with one mode of operation of the system, is then fed to valve control apparatus for metering the amount of coating material that is applied to a given length of advanced strip stock.

Unfortunately, in the coating of small elongated articles, such as fine gauge insulated wire, a precise calculation of the surface area to be coated per unit length of the wire is normally not accurate in practice because of the tolerance variations in diameter that typically exist along the wire core. Moreover, when any change in the amount of coating material to be applied to the wire is only periodically determined, i.e., after a predetermined length of the wire has been advanced through the coating material, and the recorded length has been compared with the calculated area, not only that time delay, but the time delay thereafter to properly adjust the consistency of a pulp slurry, for example, would substantially rule out any possibility that the pulp coating thickness could be accurately controlled within stringent limits in an on-line, high volume system. Reference to "pulp" herein is intended to connote a dry wood pulp, comprised, for example, of sheets of coniferous woods such as spruce, jack pine, and hemlock. Such dry pulp is converted into a wood-based, fibre refined, pulp and water slurry suitable for subsequent use in the manufacture of insulated wire. For further details with respect to such pulp insulation, reference is made to an article entitled "Manufacturing Pulp Cable", appearing on pages 86-94 of the 1971 July-October Issue of *The Western Electric Engineer*.

In view of the foregoing problems, it is not surprising that with respect to one particular process relating to the manufacture of pulp insulated wire, one preferred technique for determining the pulp coating thickness heretofore has involved an off-line, time consuming method of cutting random sections of coated wire from a given reel thereof, and immersing the wire segments in a column of mercury, with the displacement of the latter being read on a suitable scale that is correlated with coated wire diameter. While such a method has been found to be very reliable, it not only has the aforementioned disadvantage of being very time consuming, but provides only random sampled measurements of the pulp coating thickness of otherwise continuously running, high volume manufactured product.

The seriousness of only periodically measuring the coating thickness of random coated wire segments, and the excessive time involved for doing so, may be best appreciated by briefly highlighting a typical pulp coating operation. In one particular pulp coating system, sixty laterally disposed wires are coated with pulp insulation at one time, on a continuous basis, and at a speed that typically may range from 150 to 200 feet per minute. It is thus seen that if a given sample wire segment should indicate a defective pulp coating on a given wire line, many hundreds, and often thousands, of feet of wire will have been produced before the defect is not only detected, but a correction made with respect thereto in the operating process. Such a correction typically involves changing the consistency of pulp in a pulp slurry confined within a vat through which the wires are drawn during the coating operation.

With a typical vat often containing one to three hundred gallons of pulp slurry, it may take as long as fifteen to twenty minutes to change the consistency of the pulp within the slurry sufficiently to increase or decrease the coating on the bare wires passed therethrough so that the coating thickness again falls within a predetermined range. Of course, in accordance with the above described random wire segment sampling and immersion technique, should the coating thickness not be adjusted sufficiently after the first defective sample (or samples) have been ascertained, the pulp consistency would again have to be adjused, with an additional delay, and the possible coating of many more hundreds (or thousands) of feet of wire that might ultimately have to be discarded as scrap.

There thus has been an urgent need for a reliable and accurate on-line system to measure the coating thickness of pulp insulated wire continuously and, thereby, to more responsively adjust the coating process, such as through very small changes in the concentration of pulp in the slurry thereof, so as to maintain the coating thickness variations within a very narrow range at all times. This is the only way that out-of-limits coating thickness, which may result in totally defective wire, can be eliminated in high volume manufacture.

Stringent control over coating thickness uniformity of pulp insulated wire is also extremely important if such wire is to produce minimal cross talk and attenuation when used in electrical communications equipment. This is particularly true in signal transmission applications requiring operating frequencies considerably above the voice range, as mutual capacitance and pair-to-pair unbalance effects, for example, progressively increase with frequency, and are directly dependent, in part, on both the thickness and uniformity of the wire insulation.

The aforementioned coating thickness-capacitance dependent parameter is often referred to in the trade as the Diameter over Dielectric (DOD), and is commonly defined as the thickness of the insulative coating, doubled, plus the diameter of the wire core, resulting in an overall insulated wire diameter measurement. When the DOD is maintained within very close tolerances, the capacitance effects of the wire are substantially minimized and remain relatively constant with length when employed as twisted pairs in multi-wire cables. It is thus seen that maintaining uniform coating thickness is very important in this regard.

Unfortunately, neither the aforementioned automated cobble detecting apparatus, regardless of the type of on-line measuring sensor that may be employed in conjunction therewith, nor the automated coating thickness control system described hereinabove that obviates the need for sensors, is readily adaped for use in accurately monitoring and controlling the coating thickness of relatively small diameter coated wire. Moreover, if such prior art apparatus were used in combination to monitor and control the coating thickness on a plurality of such wires, the apparatus would have to be duplicated for each wire to be monitored. This, of course, would be very expensive and require considerable space.

Accordingly, in connection with high volume multi-wire pulp coating systems, there is also an urgent need for an on-line wire diameter measuring and coating thickness control system wherein a plurality of coated wires may be monitored simultaneously, but the substantial portion of the control system being common to all of the monitored wires. To that end, it would be desirous to average the measured readings for all of the monitored coated wire diameters, and should one or more abnormal readings be obtained (such as due to a glob, bare wire segment or break), to remove such a reading at least momentarily from all of the other normal readings until the cause of the abnormal reading no longer existed, or was corrected. It would also be desirous to use fluidic sensor heads for monitoring the wires on-line in a manner that would obviate the aforementioned wire jamming or breaking condition should a glob of insulation be encountered. In this manner, the need to shut down the entire coating system would not be required until such drastic action was absolutely determined necessary.

SUMMARY OF THE INVENTION

It, therefore, is an object of the present invention to provide a method of measuring and optionally also controlling, on-line, a geometrical parameter of a continuously moving elongated article in a sensitive and reliable manner, and which method is substantially immune to high temperatures, humidity, shock, vibration and moisture, as well as immune with respect to such selective characteristics as the dielectric constant, hardness and dryness (or wetness) of at least the outer surface of the article.

It is a more specific object of the present invention to provide an on-line method for reliably and accurately measuring the diameter of pulp insulated wire, and for generating process control signals representative thereof for controlling the coating thickness thereon in a manner that is completely immune to the normal environmental conditions attendant with the pulp coating process, and in a manner that is capable of detecting the presence of sporadic globs on each monitored insulated wire, and for allowing for the continued advancement of that wire without the latter either breaking as a result of a glob passing through the on-line sensing device of the apparatus, or the abnormal measurement representative of a glob adversely affecting an averaged measurement representative of the diameters for a plurality of other normally acceptable monitored wires.

In accordance with the principles of the present invention, the above and other objects are realized in one preferred illustrative method and embodiment, and relative to one illustrative pulp insulated wire coating application, wherein a fluidically operated geometrical measuring and control system is employed to continuously measure the diameter of a plurality of pulp insulated wires in an essentially non-contacting, on-line manner, and for effecting precise control over any change that may be necessary in the consistency of pulp in a pulp slurry through which the wires are drawn during the coating operation. Considered more particularly, the measuring and control system comprises a separate fluidically operated wire diameter measuring unit associated with each of the wires to be monitored, a common signal processing or averaging circuit, a separate glob detector unit associated with each of the monitored wires, and a common signal responsive pulp metering control unit.

Each measuring unit is designed to fluidically measure the diameter of an associated pulp insulated wire, and to provide a continuous back-pressure output control signal that is correlated with the measured coated wire diameter. This signal is only utilized as a control signal when the measured pulp coating thickness falls within a prescribed tolerance range. To perform such a function, each measuring unit comprises a fluidic sensor head through which a given coated wire passes, a pressure adjust valve, and out-of-limits detector circuit, and a low pressure operated gate of multi-port transfer valve.

With respect to the sensor heads, they advantageously are extremely sensitive to physical cross-sectional area changes (being capable of sensing geometric changes as small as ±0.00025 mils, for example), but significantly are insensitive to the partially wet and pliable condition of the insulated pulp wire coating.

The separate fluidic pressure adjust valve associated with each fluidic sensor head is employed to adjust the air supplied to the associated sensor head such that a predetermined valve of back-pressure is established which is correlated with the desired nominal diameter of a given gauge wire having a pulp insulated coating thereon of a given nominal thickness. This sensor head back-pressure signal is employed as a fluidic control signal which is applied as an input to both the out-of-limits detector and the transfer valve.

Each out-of-limits detector is employed to control one of the low pressure operated transfer valves such that either the associated sensor head back-pressure signal applied to the valve is directed to the active output port thereof, or a reference standard fluidic signal is directed to that output port in response to a "defect" signal supplied to a control port of the valve from the out-of-limits detector. It is thus seen that the detector functions as a differentiator by applying a control signal, normally momentarily, to the associated transfer valve only when an abnormal back-pressure signal is detected that falls outside the selected tolerance range. Such an abnormal back-pressure would typically be indicative of a serious defect, such as no pulp insulation appearing along a given region of the wire, no wire present, or an oversize wire, such as caused by a glob of pulp insulation.

The fluidic signal appearing at the active output port of each of the transfer valves (whether comprising a sensor generated signal or a reference signal) is fed to a processing circuit which comprises a plurality of parallel connected fluidic summing or averaging resistors, a fluidic operational amplifier coupled to the common output of the summing resistors, and a proportional amplifier. The fluidic summing resistors are employed to provide an averaged output process control signal, representative of all of the measured wire diameter readings when they are all within the acceptable tolerance range. The resultant composite process control signal is then proportionally amplified at a low (fluidic) level (measured in inches of water) in the operational amplifier and, thereafter, converted to a high level signal (measured in psi) in the proportional amplifier.

Should any sensor head signal be determined to be outside the acceptable tolerance range by the out-of-limits detector, the reference signal is then temporarily substituted therefor in the signal averaging circuit through the actuation of the associated low pressure transfer valve, which also effects the actuation of a suitable alarm. This signal substitution would remain until the cause of the abnormal magnitude of back-pressure established in the affected sensor head had been corrected, or no longer existed, such as in the case of a sporadic glob or bare wire section having passed through the sensor head.

The high pressure signal produced at the output of the proportional amplifier is used in controlling the aforementioned pulp metering unit. The latter unit includes a three-way high pressure valve, preferably two pneumatic controllers connected in tandem (for reasons described hereinafter), a signal responsive variable pulp metering control valve, and a magnetic flow meter. The control valve, in response to signals generated by the closed-loop circuit between the flow meter and the controllers, accurately controls the amount of pulp supplied to the coating vat containing the pulp slurry. The amount of pulp supplied to the slurry at any given time is dependent, of course, on the magnitude of the averaged process control signal representative of all of the wire diameters being measured within any given-time period. The measuring and coating thickness control portion of the composite fluidic system as thus far described is seen to operate exclusively in a fluidic mode in performing the necessary functions relating to wire diameter measurement, signal differentiation and signal averaging, and in a pneumatic signal-controlled mode in operating the pulp control valve.

In a typical pulp coating operation, wherein sixty laterally spaced wires may be coated with pulp insulation simultaneously, it has been found to be quite effective if as few as six to ten of such wires, if properly chosen (as described in greater detail hereinafter), are simultaneously monitored in order to accurately control the coating thickness of all of the wires.

In connection with the importance of temporarily removing abnormal wire diameter readings from the averaged total, it is also important when utilizing fluidic sensor heads to construct the latter in a unique manner so as to be readily opened selectively and automatically should a glob of insulation develop on a given insulated wire (or a cobble develop on a bare wire or rod stock). As previously noted, a glob (or cobble) could readily become jammed in a closed sensor head, and possible even cause the wire to break.

In order to avoid such problems, the present invention also incorporates a fluidically operated glob detector unit for each monitored wire in the composite illustrative pulp coating apparatus. The glob sensing portion of the detector unit is sufficiently spaced ustream relative to the associated sensor head so as to effect, through a fluidically controlled three-way valve and a pneumatically operated cylinder, the opening of the associated sensor head for either a predetermined period of time, or indefinitely until re-closed manually.

If any serious operating condition should arise that would cause the entire measuring and control system to go out of control, the low pressure transfer valves in the measuring units will function as "hold" devices. These valves, in conjunction with a fail-safe circuit, which functions as an AND circuit by being responsive only to signals from all of the out-of-limits detectors, will cause the high pressure three-way valve in the pneumatic controller unit to operate the controllers thereof in a pre-set mode such that a predetermined (nominal) amount of pulp will be continuously metered to the coating vat. The pulp coating system will then continue to operate in such a manually adjusted (emergency) mode so as to ensure that at least the majority of the wires continue to be coated with pulp having a thickness within a predetermined tolerance range until the malfunction is corrected, or the cause thereof, should it be an isolated fault in the coated wire (or wires) no longer exists. At that time, the control system is constructed so as to allow return to the "automatic" mode either by a manually operated push-button or an automatic reset circuit.

The fluidic measuring and control system embodied herein for carrying out the methods may advantageously be built with either discrete fluidic components, or with at least the major portions of the circuit built in a modular form with pre-formed manifold passageways. While both forms of the logic circuitry may be purchased commercially, the modular form minimizes circuit connections, tubing lengths and space requirements, and at the same time generally would increase even further the reliability and ruggedness of the circuitry. The composite fluidic system embodied herein also provides a high degree of flexibility with a minimum of operator maintenance, attention and proficiency.

BRIEF DESCRIPTION OF THE DRAWINGS

FIG. 1 is a simplified, essentially diagrammatic view of a composite system for manufacturing a plurality of pulp insulated wires simultaneously, and for continuously measuring the coating thickness on at least certain of the wires in an on-line manner, and for automatically controlling the thickness of the pulp coatings thereon through control signal initiated adjustment of the pulp slurry consistency in accordance with the principles of the present invention;

FIG. 2 is an enlarged perspective view of the vat and rotatable mold or coating drum depicted generally in FIG. 1, and illustrates in greater detail a preferred construction of the drum employed to apply pulp insulation to a plurality of bare wires passed in parallel relationship partially around the lower half of the drum submerged in a pulp slurry;

FIG. 3 is an essentially diagrammatic view showing in greater detail the various fluidic logic devices which form a wire diameter measurement averaging and amplifying circuit represented by the similarly labeled block diagram in FIG. 1;

FIG. 4 is an enlarged, fragmentary perspective view of the mechanical and fluidic sensor portions of the glob detector unit embodying the principles of the present invention, and depicted only generally in FIG. 1;

FIG. 5 is an enlarged, fragmentary perspective view of the fluidic sensor head assembly, and further illustrates how the assembly is sub-divided in accordance with one preferred embodiment of the invention so as to allow any one of a plurality of distinct and displaceable sensor head portions to be opened by the signal controlled actuation of an associated pneumatic cylinder;

FIG. 8 is a diagrammatic illustration of a fluidic-to-electric interface alarm circuit employed in the indicator module of FIG. 7.

DETAILED DESCRIPTION OF THE INVENTION

Background of the Associated Apparatus

Figure 6:
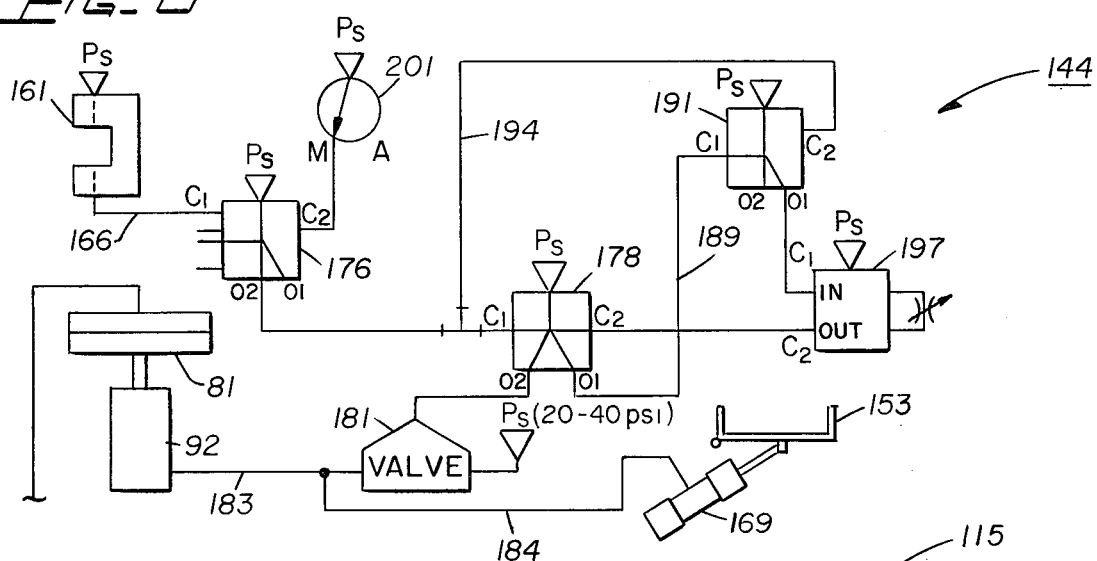
FIG. 6 is a diagrammatic view showing in greater detail the various fluidic logic devices comprising the glob detector circuit depicted only generally in block diagram form in FIG. 1.

As previously mentioned, the fluidically operated measuring and control methods and system embodied herein, and described in greater detail hereafter, have universal application, but for purposes of illustration are disclosed for use in connection with the manufacture of pulp insulated wire and, more specifically, with respect to the accurate and continuous measuring and control of the thickness of the pulp insulated coating on the wire.

With particular reference first to FIG. 1, there is disclosed in simplified and essentially diagrammatic form, a composite system 20 for manufacturing pulp insulated wire of the type employed extensively in various communications applications, such as in exchange area cable in the telephone industry. Such insulated wire typically has a copper core, drawn down to a diameter generally falling in the range of 16 to 30 gauge wire. Such insulated wire is normally packaged in cables of various sizes, often comprising from 300 to 2700 pairs.

As previously mentioned, pulp insulated wire has excellent cost-performance advantages with respect to voice transmission, however, at considerably higher frequencies, such as required in connection with microwave and data transmission, appreciable cross-talk and attenuation are normally encountered unless very stringent tolerances are maintained with respect to the physical parameters of the insulated wire. In particular, it has been found that for high frequency applications, diameter variations, due primarily to coating thickness variations, have a pronounced effect on the mutual capacitance and the pair-to-pair unbalance effects in twisted pairs of such wire. For those reasons, the aforementioned parameter referred to as Diameter over Dielectric (DOD) has become a critical geometrical parameter that must be maintained within very close tolerances if pulp insulated wire is to be a truly competitive choice relative to other types of insulated wire in high frequency communications systems. The primary variable in the DOD parameter, of course, is the coating thickness of the dielectric insulation.

In describing the coating system 20 of FIG. 1, it is to be understood that a plurality of bare wires 22, preferably of copper, are simultaneously cleaned, then coated with pulp insulation and finally dried. In one particular coating system, sixty laterally disposed wires are processed at one time, with the wires advancing through the various processing stations at a rate that typically may range from 150 to 200 feet per minute. The bare wires 22 to be coated with pulp insulation are respectively drawn from a plurality of laterally disposed supply reels 23 (only one being seen in FIG. 1), and progressively advanced through the various processing stations before being rewound as pulp insulated wire on respectively aligned take-up reels 24 (again only one being seen) in FIG. 1. It is understood, of course, that the reels 23, 24 may actually comprise winding forms of many different conventional types.

The first processing station typically comprises an electrolytic cleaning tank 26, comprised of a caustic solution, such as ortho-silicate, through which the wires pass while a high current is simultaneously applied to each of the wires relative to the cleaning tank 26. The current may be applied to the wires in a number of ways, one way being through the biasing of at least one, but preferably two (or more) suitably mounted and electrically isolated guide rollers 28 as anodes (+ potential), relative to the cleaning tank 26, biased as the cathode (− potential). After the cleaned wires leave the cleaning tank 26, they are directed by guide rollers 31 into a rinse tank 34 wherein the wires are rinsed of any cleaner residue, as well as of any other loosely deposited contaminants, that may still remain thereon. In addition to a simple water bath, the wash tank may also include water spray nozzles 36 to further facilitate the cleaning of the bare wires. To that end, the rinse tank also has a drain 37 connected thereto.

Upon the rinsed wires 22 leaving the common water tank 34, they are directed by a pair of guide rollers 39 around the lower half of a pulp coating mold 41 which is rotatably supported within a coating vat 43. This vat contains a pulp slurry of conventional composition and consistency, and has a suitable conduit 46 associated therewith for supplying pulp, such as in a pulp-water-binder solution with two per cent pulp, to the slurry as required. The pulp is supplied in an automated, controlled manner in accordance wit the principles of the present invention.

As best seen in FIG. 2, the rotatable coating mold 41 preferably comprises a relatively large diameter cylinder, the outer periphery of which is formed with a relatively fine mesh screen which may be made of either plastic or metal, but is preferably made of stainless steel or bronze. The screen is only exposed to define a plurality of laterally spaced and narrow circumferentially disposed bands 41a. The much wider bands 41b alternately disposed therebetween are covered with a suitable protective material, such as an acrylic plastic resin, one preferred type being sold and referred to commercially as Ambroid cement.

Upon the mold 41 being rotated, while the lower half is submerged in the pulp slurry, discrete strands of pulp from the pulp slurry are deposited on the wires in the narrow band regions 41a whereat the screening material is exposed. These small deposited pulp strands accumulate to form essentially flat, pliable, pulp ribbons. The ribbons of pulp are formed and adhere to the wires in the regions of the exposed screening material as a result of the pulp slurry being continuously pumped inwardly therethrough towards the axial center of the rotatable mold in a recirculating manner.

After the wires 22, with the respective pulp ribbons adhering thereto, leave the coating vat 43, some of the water is removed from the ribbons as they respectively overlie the wires as the latter are supported on an endless belt or carrier 47, which is driven at the same speed as the wires. As the belt, wires and ribbons move in unison to and through a plurality of laterally disposed pairs of pressure rollers 49, which pairs are respectively aligned with the wires, most of the excess water in the pulp ribbons is removed.

After leaving the pressure rollers 49, the partially insulated wires are then directed through respectively associated forming die stations 51. Each forming station 51 incorporates a plurality of die assemblies that respectively frictionally contact and rotate the pulp ribbon about the associated wire so as to produce a spiral wrapping effect (referred to as polishing). This operation, while the ribbon is still moist and pliable, ensures that each resulting pulp coating is smoothly and uniformly disposed symmetrically about the wire core before being completely dried.

As depicted in FIG. 1, after the pulp coated wires leave the forming station 51, they are passed through an oven 53, preferably sectioned with multiple temperature zones, wherein the still somewhat moist and pliable pulp coatings are dried. After leaving the oven 53, the finished pulp insulated wires are wound upon different take-up or storage reels 24 respectively aligned therewith. While reels are shown, it is obvious that any conventional type of winding form may be employed for the intended purpose.

In accordance with the manual mode of operation for controlling the pulp coating thickness heretofore, a single commercially available pneumatic controller, such as 55a depicted in FIG. 1, in conjunction with an interconnected actuable flow valve 56 and a magnetic flow meter 57, had been employed for that purpose.

An adjustable "set point" on the controller 55a was pre-set so that the flow valve 56, in response to signal information continuously fed back to the controller from the flow meter 57, would meter only the predetermined amount of pulp per unit of time into the coating vat 43.

As previously mentioned, when any change was required in the pulp slurry heretofore while the system was operating under manual control, the controller 55a would have to be manually reset so as to allow either more or less pulp to be fed to the vat 43. A decision as to whether a change in the pulp consistency was needed or not under such manual operation, of course, was only known after wire sample segments were measured for coating thickness by the aforementioned mercury immersion technique. Because of the amount of pulp slurry typically required in the vat, generally between 150 to 200 gallons, it may require between five to twenty minutes before the effect of any single adjustment of the pulp slurry consistency could responsively effect a change in the pulp coating thickness on the wires.

Further details with respect to the construction of the equipment employed at the cleaning, rinsing, coating, forming and drying stations are not necessary in order to understand the principles of the present invention. Should such details nevertheless be desired, reference is simply made at this point to the aforementioned article entitled "Manufacturing Pulp Cable", appearing on pages 86-94 of the 1971 July-October issue of *The Western Electric Engineer.*

CONTROL SYSTEM FOR CONTINUOUS, AUTOMATED MEASURING AND CONTROL OF INSULATED PULP WIRE COATING THICKNESS

It should be fully appreciated at the outset that the subject invention is applicable for use in universal applications wherein it is desired to measure a geometrical parameter of elongated articles, in general, whether of symmetrical or asymmetrical cross-section, and whether of strand or web form, and to thereafter control the thickness of a coating applied to such articles, and/or fluidically detect the presence of random abnormal cross-sectional area changes (i.e., cobbles or globs) on such articles, and to responsively open a fluidic type sensor head to allow such an obstruction to pass therethrough.

With attention directed initially again to FIG. 1, the composite pulp insulation coating system 20 as thus far described, further includes in accordance with the principles of the present invention, with respect to carrying out the methods, an automated, fluidically controlled measuring and coating thickness control system identified generally by the reference numeral 65. This system, as it pertains to each monitored wire, is comprised of four basic and interrelated sub-units, namely, a separate fluidically operated wire diameter measuring unit associated with each of the monitored wires, identified within the dash-lined box 68, a common signal averaging and amplifying unit, identified within the block diagram 71, a separate glob detector unit associated with each of the sensing units, identified within the dash-lined box 73, and a common signal responsive pneumatic controller unit for automatically metering the amount of pulp supplied to the pulp slurry, identified within the dash-lined box 76. As the fluidically operated units separately associated with each monitored wire are of identical construction, reference will generally be made hereinafter to such apparatus as it pertains to only one monitored wire.

WIRE DIAMETER SENSING UNIT

Figure 7:
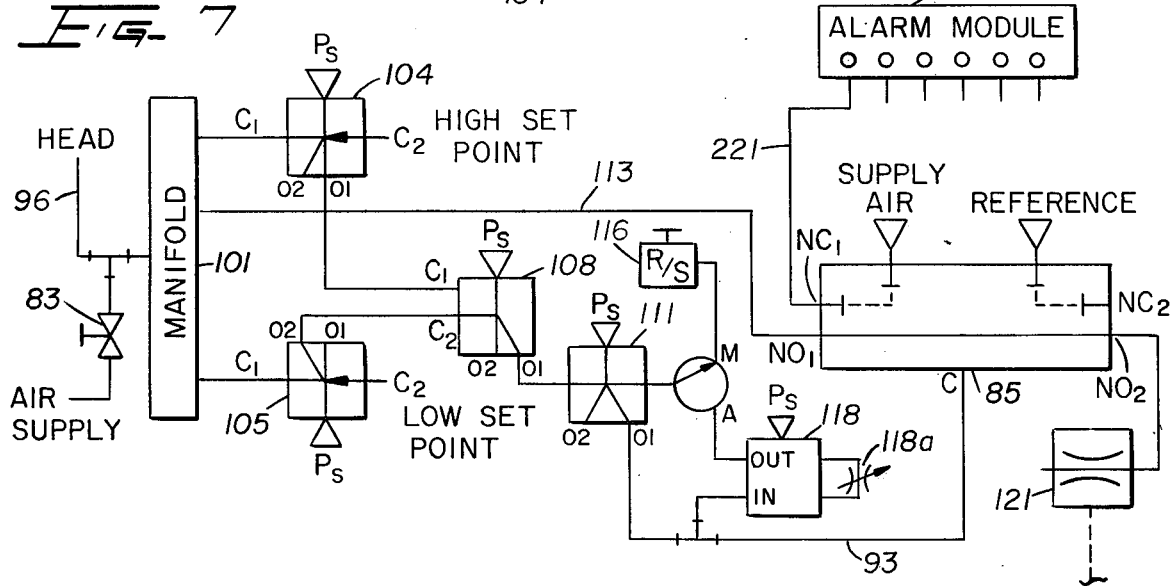
FIG. 7 is a diagrammatic view showing in greater detail the various fluidic logic circuit devices comprising the out-of-limits detector circuit depicted generally in block diagram form in FIG. 1, and the relationship of these devices relative to an associated fluidically operated transfer valve and an alarm indicator module.

With particular attention now directed to one of the measuring units 68 (FIG. 1), it comprises a fluidic sensor head 81 (best seen in FIG. 5), through which an insulated wire 22 passes, a high supply pressure adjust valve 83 (FIG. 7), an out-of-limits detector circuit 84 (shown in detail in FIG. 7), and a low pressure, multi-port gate or transfer valve 85 (shown in FIGS. 1, 3 and 7, best seen in latter).

Considering first the sensor heads in greater detail, as depicted in FIG. 1, they are located downstream of and intermediate the electric furnace 53 and the associated take-up storage reels 24. In accordance with a preferred embodiment of the invention, and as best seen in FIG. 5, each sensor head 81 in one illustrative embodiment is uniquely formed in part by an upper, stationary, and common gauge plate 86 that extends laterally across and on the upper side of the pulp insulated wires 22, and by a discrete, retractable, grooved gauge plate 88. As illustrated, the lower gauge plates 88 are individually mounted on respective pistons 91 of pneumatic cylinders 92 so as to be reciprocally and selectively displaced relative to the upper gauge plate 86. In this manner each sensor head 81 allows a glob 89 (over build-up) of insulation, for example, on a given wire 22 to pass therethrough. The signal responsive manner in which the sensor heads 81 are selectively opened and closed will be discussed in greater detail hereinbelow.

Both the upper and lower gauge plates are preferably made of metal, such as aluminum, with the grooves 88a in each lower gauge plate preferably being coated with a hard material so as to minimize wear. The lower gauge plates 88 are also preferably spaced apart so as to be respectively aligned with only a portion of the total number of pulp insulated wires being manufactured. The reasons for this will also be discussed in greater detail shortly. It should be appreciated that the upper stationary gauge plate 86 may also be subdivided as the lower gauge plates. This may be desired in certain applications, such as when there is a considerable space between adjacent wires to be monitored, or when only certain ones out of a plurality of wire disposed in a rather wide lateral array are to be monitored. It, of course, should also be appreciated that either sensor head gauge plate may be made stationary, or they both may be made movable relative to each other in certain applications, as long as they are accurately aligned and oriented while in a closed or mating position for use.

By way of example only, the sensor heads 81 were designed for use in the one illustrative application to control the thickness of the pulp coating applied on 24 gauge wire. This gauge wire was chosen, in part, because it constituted the midpoint of a range of wire gauges to be manufactured with the composite pulp coating system 20. As such, the control system, and the sensor heads, in particular, were more readily adaptable for use in controlling the coating of other closely related wire diameters.

In arriving at the proper dimensions for the sensing heads 81, it was determined that each head should accept 24 gauge wire (0.038 inch), allowing for a diameter deviation of ±0.0014 inch. In order to produce a responsive sensor generated fluidic control signal over the chosen wire diameter tolerance range, nomographs of various stock gauge plates were prepared, based on well known fluid flow principles and data. Using such nomographs, it was determined that a 0.05 inch gauge plate would produce an optimum output-to-input signal change.

However, as a result of actual experimentation, it was found that the optimally chosen sensor head gauge plates were actually too sensitive for the dynamic wire diameter measurements intended, as they would actually detect even the minute surface irregularities normally appearing on the outer surfaces of the pulp coatings. In addition, the pneumatically operated controller unit 76 for metering the amount of pulp supplied to the pulp slurry (FIGS. 1 and 9), could not effectively adjust the associated pulp supply control valve in response to such minor detected coating surface irregularities. As a result, 0.06 inch sensor head gauge plates were found to be more suitable for the monitoring purpose intended, as the sensitivity of the sensor heads to diameter changes in the coated wires passed therethrough was more closely correlated with the responsive capabilities of the composite coating sytem.

Advantageously, and importantly, the weight of each coated wire, which normally would vary in direct proportion to its diameter, is not a factor in obtaining an accurate output fluidic signal representative of the actual cross-sectional area thereof at any given point along its length. Similarly, the sensor heads 81 are also not affected by the moisture content of the exposed article material, or the relative humidity and/or temperature of the atmosphere, or the temperature of dielectric constant of the article material. It should also be appreciated that it makes no difference with respect to the fluidic sensor heads whether the wires (or any other articles) being monitored are of symmetrical or asymmetrical configuration.

For the one particular pulp coating application described herein, wherein sixty copper wires are coated with pulp insulation simultaneously, it was ascertained that accurate control over the pulp coating thickness could be achieved without requiring the monitoring of all sixty wires. This became particularly evident after a decision was made in accordance with the principles of the present invention to average the back-pressure generated output control signals from all of the monitoring sensor heads, and to utilize each an averaged signal as a common process control signal. While this substantially simplified the fluidic control circuitry required, it presented a problem in that as the number of wires being monitored are reduced, the greater will be the effect of any abnormal reading on the average derived from all of the sensor head outputs.

Compounding this problem is the fact that in a typical pulp coating system of the type illustrated herein, the diameters of the array of laterally disposed pulp insulated wires are not uniform. Rather, the outermost coated wires, and several at and near the middle, tend to exhibit greater variations in coating thickness than the oher wires of the array. However, by eliminating those wires for purposes of monitoring, the maximum variations normally expected between the remaining wires is substantially decreased.

With such inherent coating thickness variations in mind, it was found possible to monitor as few as six of the remaining wires for control purposes. In this connection, a built-in allowance was made (imperically derived) for a certain limited number of wires out of the total of sixty that could be expected to be slightly out-of-limits at any one time. While monitoring six versus ten wires, for example, has the result of increasing the standard average diameter deviation of the monitored wires, that possible increased deviation is insignificant with respect to the variability of the total wire diameter readings making up the average.

Also associated with each sensor head 81 in the composite sensing unit, is the previously mentioned pressure adjust valve 83, the out-of-limits detector circuit 84 and the transfer valve 85. Each supply pressure adjust valve 83 (see FIG. 7) is employed to initially adjust an associated sensor head 81 back-pressure to a pre-adjusted value that will produce a reliable back-pressure-established output signal that not only falls within a range that may be readily calibrated with the nominal cross-sectional area of a pulp coated wire when passed therethrough, but to vary in pressure within an effective range that is applicable for use in operating certain of the fluidic devices in the composite measuring and control system. In operation, of course, it is appreciated that the magnitude of back-pressure established by each sensor head will increase or decrease in a directly correlated manner with a detected increase or decrease in wire diameter. In practice, the pressure adjust valve 83 is normally calibrated to correspond with wire diameter measured in mils. A typical magnitude of sensor head back-pressure may be of the order of twenty inches of water, with a ± range of approximately five inches of water being effective for most wire diameter deviations involving 18 to 26 gauge wire, for example.

Should any monitored wire line produce an abnormal sensor head back-pressure signal, e.g., as a result of no pulp on the wire, or a glob of insulation thereon, or a condition where no wire is present, such an abnormal signal could seriously affect the magnitude of the averaged process control signal representative of all of the other sensor head outputs if not compensated for in some way. It is to overcome this problem that a separate out-of-limits detector 84 and a separate transfer valve 85, both depicted generally in block diagram form in FIG. 1, are employed with each sensor head.

More specifically, each detector 84 is designed to produce an output defect signal in response to any sensor head back-pressure input signal applied thereto that is indicative of a measured coated wire diameter being outside an acceptable tolerance range. Should such a condition occur, the defect signal is applied over a line 93 (FIG. 7) and actuates the aforementioned transfer valve 85. The latter, when actuated, at least momentarily substitutes a standard reference signal, representative of a desired nominal wire diameter, for the abnormal sensor head signal at the output port $NO_2$ of the transfer valve. The manner in which the sensor head back-pressure signals and/or reference signals are selectively directed through the respective transfer valves 85, and how such signals are subsequently averaged to produce a composite process control signal, will be described in greater detail hereinbelow.

With reference again to the out-of-limits detector 84, it may take many forms, with one diagramatic embodiment thereof being shown in detail in FIG. 7. Therein it is seen that the back-pressure output signal from the associated sensor head 81 (not shown in FIG. 7) is applied through a line 96 and a suitable manifold 101 to the respective control ports $C_1$ of a pair of Schmitt triggers 104 and 105, In addition to the required fluidic supply pressures $P_s$, there is also a HIGH SET POINT and a LOW SET POINT supply pressure applied to the control ports $C_2$ of the triggers 104 and 105, respectively. These set points ar chosen, of course, so as to be correlated with the maximum acceptable deviation in wire diameter, such as ±0.0014 inch for a wire having a nominal diameter of 0.038 inch (24 gauge) in the illustrative application.

With the Schmitt triggers 104, 105 biased as disclosed, it is readily seen that the trigger 104 will normally produce an output signal that exhausts through the output port 02, unless the sensor head back-pressure signal associated therewith should rise above the HIGH SET POINT signal level. Conversely, the Schmitt trigger 105 will normally produce an output signal that exhausts through the output port 01 thereof, unless the LOW SET POINT signal should become higher in magnitude then the sensor head back-pressure signal.

Whenever a given sensor head back-pressure signal increases or decreases beyond the high or low set point setting, an output signal from one of the Schmitt triggers 104 or 105 is applied to either the $C_1$ or $C_2$ control ports of an OR gate 108. This device, in response to such an input signal, produces an output signal through the port 01 thereof that is, in turn, applied as an input signal to a control port $C_1$ of a flip-flop 111. A resulting output from the port 01 of the flip-flop is then applied as an input control signal to the previously identified transfer valve 85.

This valve, with or without a timed reset circuit associated therewith, in response to any input signal applied to the control port C thereof, causes a normally open input port $NO_1$, connected to the associated sensor head 81 over an air line 113, to close, and two normally closed out ports $NC_1$ and $NC_2$, to open. The port $NC_1$ supplies a defect signal to actuate an appropriate indicator in an alarm module 115, which alerts an operator of the fact that an out-of-limits condition exists with respect to the identified monitored wire.

The opening of the normally closed output port $NC_2$ of the transfer valve 85 allows a standard pre-set pressure signal, representative of a desired nominal coated wire diameter, to be at least momentarily included in an average with all of the other sensor head back-pressure signals applied to the processing or averaging circuit 71 depicted in FIGS. 1 and 3, which circuit will be described in greater detail hereinbelow.

The multi-port transfer valve 85 may be readily reset to the normal input-output conditions disclosed in solid line form in FIG. 7, by utilizing either a manual reset pressure swtich 116, or a pre-set fluidic time delay device 118. The latter device is adjustable, through a variable restrictor 118a incorporated therein, so as to control the time, such as from several seconds to several minutes, before an input signal applied thereto, from the output port 01 of the flip-flop 111, will produce an output pulse. Such a pulse, of course, upon being applied at the control port $C_2$ of the flip-flop 111, resets the latter. Should the back-pressure output signal from the associated sensor head 81 be within acceptable limits at that time, there will be no control signal applied to the port C of the transfer valve 85, as the flip-flop output will then be exhausting through the port 02. As such, the sensor head signal will again be transferred from the input port $NO_1$ of the transfer valve 85 to the output port $NO_2$ thereof for further processing.

The alarm indicators employed in the alarm module 115 may either be of the fluidic, color coded type, or of the fluidic-to-electric interface type which energize assocoated incandescent lamps. One form of the latter type is illustrated in FIG. 8, and will be described in greater detail hereinafter. Such alarm indicators are of conventional design, and may be purchased commercially from a number of different sources, such as from the Corning Fluidics Department of Corning Glass Works, Inc.

Similarly, the fluidic devices in the out-of-limits detector 84 are also of conventional design and may be selectively purchased from a number of sources, including the Corning Glass Works, Inc., and the General Electric Company. Alternatively, a completely assembled circuit module for use with a fluidic sensor head, which module performs the out-of-limits signal differentiation function, actuates alarm indicators when an out-of-limits condition is detected, and provides fluidic signal applicable for use in operating auxiliary logic circuitry and/or devices, in general, may be purchased from the General Electric Company under the registered tradename Qualiguard or from E-B Industries, Inc., under the tradename CROS-SEC.

The multi-port, low pressure actuated transfer valve 85 may take any one of a number of different structural forms of conventional design, utilizing either internal fluidically or pneumatically operated pistons, or flexible or displaceable diaphrams. One type of the latter valve applicable for use in the present invention is sold by the Genicon Company, Inc.

FLUIDIC SIGNAL AVERAGING CIRCUIT

Attention will now be directed to the signal averaging circuit 71, shown in block diagram form only in FIG. 1, but in a more detailed diagrammatic view in FIG. 3. This fluidic circuit comprises a plurality of fluidic resistors (or restrictors) 121a-f (only three being shown) of conventional design, each associated with a different sensor head 81. More specifically, the output signal from each sensor head, as previously noted, is connected to an input port of the associated transfer valve 85. As such, each resistor 121 has applied thereto from a different transfer valve 85 either a variable back-pressure output signal from the associated sensor head, if the magnitude of such a signal is within the pre-selected range, or the standard reference pressure signal. The latter signal, it will be recalled, is applied to a given resistor 121 only after the associated transfer valve 85 has been actuated by a defect signal applied thereto by the flip-flop 111 (FIG. 7) in the associated out-of-limits detector 84.

The resistors 121a-f are connected in parallel by having their respective outputs connected to a common manifold 123. The resulting summed or average sensor head back-pressure signal derived at the output of the manifold 123 is then applied as a process control signal to an input of a common fluidic operational amplifier 126 of conventional design.

In order to improve servo-linearity and accuracy, the output of the operational amplifier 126 is fed back through an adjustable resistor 128 positioned in a feedback loop 129 to the input of the operational amplifier. The fluidic control system gain is also established, at least in part, by adjusting the feedback resistor 128.

Figure 9:
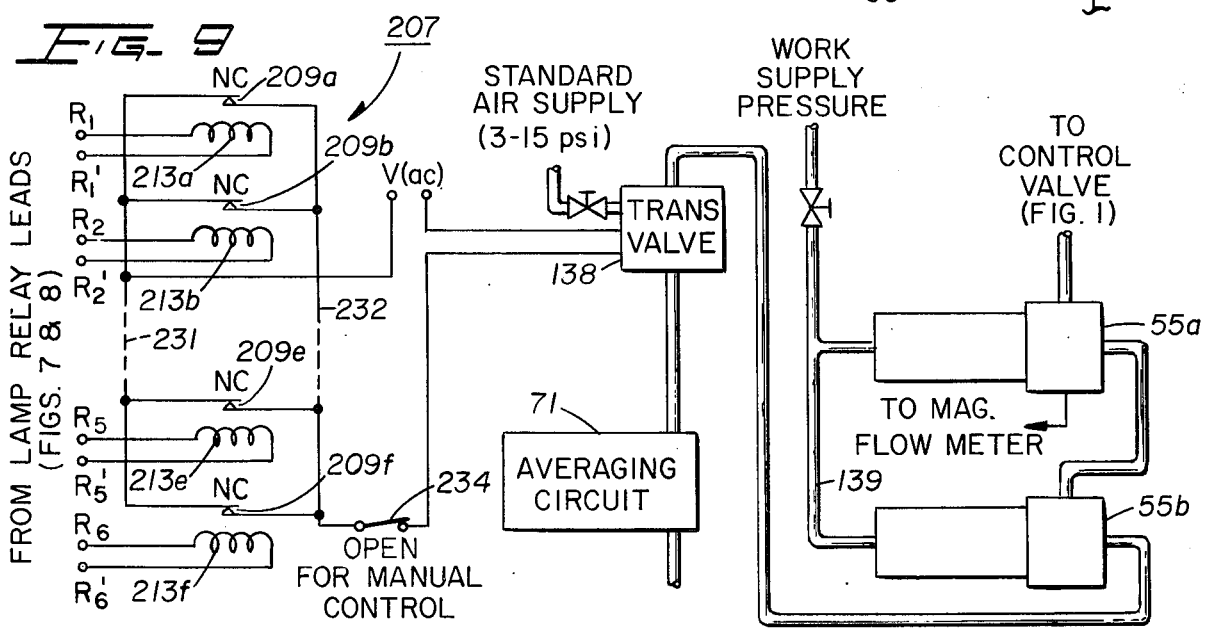
FIG. 9 is a partially schematic and partially diagrammatic view of a fail-safe circuit incorporated in the measuring and control system.

While the output from the operational amplifier 126 is a variable process control signal which accurately represents the average of all of the monitored wire diameters at any given instant in time, the magnitude of such a signal is too low (measured in only inches of water) to directly control the pneumatic controller unit 76 (FIGS. 1 and 9). Accordingly, a high level proportional amplifier 133 (see FIGS. 1 and 9) of conventional design is connected between the output of the operational amplifier and the pneumatic controller unit 76. Such an amplifier simply functions as a fluidic-to-pneumatic interface, through which a low level pressure signal applied to a control port thereof is transformed proportionally into a much higher pneumatic signal, such as in the range of 3-15 psi for the particular pulp coating of wire application of concern herein.

AUTOMATICALLY OPERATED PNEUMATIC PULP CONTROLLER UNIT

The composite pulp controller unit comprises the pair of essentially identical pneumatic controllers 55a and b, the actuable pulp flow valve 56, and the magnetic flow meter 57 (see FIGS. 1 and 9), all previously identified together with an electrically operated, high pressure three-way transfer valve 138. All of these components are of conventional design and are commercially available from a number of sources. For example, one preferred type of pneumatic controller is sold by the Fisher-Porter Company. A suitable magnetic flow meter may also be purchased from that company, and an electrically operated transfer valve of the type described herein may be purchased from a number of companies, such as the Automatic Switch Company.

The specific function of the composite pulp controller unit 76, of course, is to control the amount of pulp supplied to the pulp slurry (in the coating vat 43, FIG. 1) in response to the magnitude of the high level process control signal supplied thereto from the proportional amplifier 133 (FIG. 6), which forms part of the averaging circuit 71.

To better understand the function of the controllers 55 as employed in tandem, a brief description will first be given of the characteristic automated mode of operation of the controllers. They each operate in accordance with two control modes which may best be described as a proportional action and a reset action. These modes are combined in each controller, albeit in different ways, to ultimately determine the magnitude of the high pressure output process control signal applied to the flow control valve 56 from the controller 55a. Considered more specifically, there are automatic-manual and "set point" control knobs (not shown) associated with the controller 55b, and only an automatic-manual control knob (not shown) associated with the controller 55a. The set point on the controller 55b is adjusted by an operator, and is directly equatable with gallons per minute (e.g., of pulp) that the adjusted controller attempts to meter through the control valve 56 per unit of time, as measured by the flow meter 57.

The set point control knob (as well as the internal circuit associated therewith) is removed from the controller 55a because the output signal from the controller 55b is effectively employed as the variable set point signal in the controller 55a. This latter signal is actually inversely proportional to the pulp coating thickness on the monitored wires at any given point in time.

More specifically, whenever the pulp insulation thickness on the monitored wires (represented by the averaged magnitude of all of the back-pressure signals from the sensor heads 81) increases, for example, by a certain amount above a nominal value, the magnitude of the resulting output signal from the controller 55b will be reduced by a proportional amount from the adjusted set point pressure thereof. That output signal is then applied as a proportionally lower (variable) set point signal to the input of the controller 55a. Such an input in the latter controller will result in an output process control signal therefrom that is higher than the normal magnitude so as to, in turn, adjust the control valve 56 by an amount that causes a proportionally lower amount of pulp to be metered therethrough. The converse, of course, would be effected by the controllers 55 should the average fluidic signal magnitude from the sensor heads 81 be lower than the chosen nominal magnitude therefor.

With particular reference to the use of two rather than one of the controllers 55, it was found that when an increase or decrease of pulp in the pulp slurry was required, a considerable time-lag, as previously mentioned, is encountered before the effect of any given change in the pulp consistency is noted as a measured change in the coating thickness on the monitored wires. With only one controller, such as 55a employed, and with the latter assumed to have a pre-set set point, it was found that the output signal therefrom would vary in an uncontrolled oscillatory manner with such high and rapid changes that the diameter of the pulp coated wires could not be readily controlled with the desired degree of accuracy and uniformity.

However, by utilizing the second controller, namely 55b, in tandem with the controller 55a, such that the output of the former is fed directly as a variable set point to the input of the latter, a substantial improvement is realized in attaining uniform coated wire diameter. More specifically, the second controller 55b essentially functions as an effective time delay and signal damping device so as to substantially smooth out any minor or major fluidic signal changes produced by the fluidic sensor heads 81. If such signal variations were not damped sufficiently, an intolerable oscillatory condition would develop that, in turn, would lead to a very detrimental and uncontrollable variability in the coating thickness of the pulp insulated wires.

The use of tandem controllers connected in the manner described hereinabove also gives rise to a number of other significant advantages. One is that the controller 55b with a pre-set set point allows the wire coating thickness to be readily set to a nominal thickness at the start of a given production run. A second advantage of the tandem controllers is that the proportional control mode of the controller 55b may be adjusted so that the resulting process control output signal from the controller 55a may be made more responsive (i.e., not delayed as long as normal) in situations where an abnormal change is detected in coated wire diameter by the sensor heads 81. Third, the delay action produced by the tandem controllers can be increased or decreased more effectively to reflect the inherent characteristics of the particular coating system, as well as the effect produced on the fluidic measuring and control system by different gauge wire being coating with pulp insulation. Finally, the use of the second controller 55b has also made it possible to install a "fail-safe" control circuit in a simplified manner. The reasons for this, as well as a description of the fail-safe circuit, will be described in greater detail hereinbelow.

By switching the control knobs on the controllers from automatic to manual, all of the fluidic measuring and control circuitry described hereinabove is completely isolated from having any effect on the pulp control valve 56. Should it be necessary for some reasons to operate temporarily in the manual mode of operation, work supply pressure applied through an input conduit 139 (FIG. 9) allows the necessary operating functions to be performed in the controllers, for a given set point setting (on the controller 55b), so as to meter the desired amount of pulp through the flow control valve at a desired set rate per unit of time.

GLOB DETECTOR UNIT

As thus far described, it it seen that the fluidically operated wire measuring and signal averaging units 68 and 71, together with the pneuamtic controller 76, (1) measures the diameter of a plurality (such as six in the illustrative example) of pulp insulated wires on a continuous, on-line basis in a pulp wire manufacturing system, (2) computes an average for all of the measured wire diameters, compares this averaged signal magnitude with a pre-set set point pressure, and utilizes the difference in magnitude therebetween to produce an output signal that effectively and accurately controls the amount of pulp supplied to the pulp slurry in order to control the thickness of the pulp coating on the wires being manufactured.

In accordance with the principles of the present invention, the unique measuring and control methods embodied herein are further implemented by; the composite subject control system 65 of FIG. 1 including the previously identified glob detector unit 73, depicted generally within the dash-lined box in FIG. 1, but selectively shown in greater detail in FIGS. 4–6. The glob detector unit 73 basically comprises a glob sensing unit identified generally by the reference numeral 141 (FIG. 4), a fluidic glob detector control circuit 144 (FIGS. 1 and 6), and the previously identified signal responsive pneumatic actuator in the form of an air cylinder 92 (FIGS. 1, 5 and 6) which supports the lower grooved gauge plate 88 of an associated sensor head 81.

It is understood that a different glob detector unit 73 is associated with each of the sensor heads 81. The purpose of each glob detector unit, of course, is to provide a means of opening any one of the sensor heads 81 should a glob 89 (previously identified and depicted in FIGS. 4 and 5) of insulation be detected on a given wire upstream of the sensor head. If the downstream sensor head 81 were not opened so as to allow such a glob to freely pass therethrough, the glob could readily become jammed within the passageway of the closed sensor head, which condition would normally result in the affected wire breaking. If that should happen, of course, a considerable amount of downtime and a substantial loss of manufactured product would occur.

Thus, the important function of the actuable pneumatic cylinder 92 is to allow the lower grooved gauge plate 88 of the associated sensor head 81 to open when a glob 89 on a wire is deteced, and after passage of the glob, to return the lower gauge plate 88 into mating relationship with the upper stationary gauge plate 86. When the gauge plates are in mating relationship, of course, they form an air-tight seal therebetween, except for the opposed ends of the grooved passageway 88a formed in the lower gauge plate. It is understood, of course, that in certain applications, it may be desirable to form both gauge plates with mutually disposed grooves which together defined the passageway.

With attention now directed to FIG. 4 in greater detail, it is seen that the fluidic and mechanical glob sensing assembly 141 of the glob detector unit 73 includes an essentially M-shaped wire sensing element 148 that is mounted on a rod 151 which, in turn, is rotatably supported at opposite ends on a stationary frame 153. The rod 151 is counterweighted in a suitable manner, such as by a simple outwardly extending wire element 154, so that the wire element 148 is normally positioned in an up-right vertical position. The latter element is bent along an intermediate region thereof so as to form an upwardly exposed U-shaped region 148a that is dimensioned to allow a pulp insulated wire 22 having a diameter falling within the acceptable tolerance range to pass freely therethrough. However, should a glob 89 of insulation develop on the coated wire, as depicted in FIGS. 4 and 5, such a glob would cause the sensing wire element 148 to pivot clockwise about the rotatable support rod 151 to a position that is sufficient to allow the glob to pass thereby.

In accordance with the principles of the present invention, any mechanically sensed glob 89 on a given wire 22 is transformed into a fluidic glob control signal employed to effect the opening of the affected sensor head. To accomplish this, an L-shaped wire element 156 is also mounted on the rod 151, with the upper horizontal leg portion 156a functioning as a fluidic jet stream interrupter. More particularly, the leg portion 156a extends into a U-shaped recess 159 of a conventional, commercially available interruptable fluidic jet sensor 161, which has a low pressure air supply applied thereto through an input line 163. This input extends through an internal passageway 164a, shown by dash lines, formed in the upper leg portion 161a thereof. That passageway is aligned with a similar internal passageway 164b formed in the lower leg portion 161b of the interruptable jet sensor 161. As such, whenever the upper leg portion 156a of the pivotally mounted L-shaped wire element 156 is moved clockwise into alignment with, and interrupts the jet stream extending across the recess of the interruptable jet sensor 161, an abrupt pressure drop is established in the jet stream directed into an output line 166.

Before describing the function of the glob control signal appearing in the jet sensor output line 166, it should be noted that the frame 153, supporting the rotatable rod 151 and wire elements 148 and 156, is pivotally mounted on a stationary support frame 168 so as to allow the downward displacement thereof relative to the path of a normally aligned wire 22. This is normally required when a new group of wires are strung through the pulp coating apparatus at the beginning of a production run, or when one or more wires break and must be re-strung during a production run. Such pivotal movement of the mechanical portion of the glob sensing assembly 141 is effected through an actuable pneumatic cylinder 169, a piston 172 of which is suitably coupled to a flange 173 secured on the underside of the pivotal frame 153. The pneumatic cylinder 169 is mounted at the opposite end to a bracket 174 secured to the stationary frame 168. The manner in which the pneumatic cylinder 169 is actuated will be discussed in connection with the glob detector circuit 144 not to be described.

With particular reference to FIG. 6, it is seen that the output signal from the interruptable jet sensor 161 is applied over the previously identified air line 166 to an input control port $C_1$ of an inhibited OR gate 176. When that normal operating condition exists, the output from the gate 176 exhausts through the port 01 thereof. As a result, there is no input signal applied to the control port $C_1$ of a flip-flop 178.

With the flip-flop assumed at this point to be in its normal operating state, it will provide an output signal through the port 02 thereof to a fluidic-to-pneumatic threeway control valve 181 of conventional design, one preferred type being available from Corning Glass Works, Inc. This valve, in response to a control signal from the flip-flop 178, supplies a high pressure output signal over an air line 183 to the previously described pneumatic cylinder 92, which effects the opening and closing of an associated sensor head 81. The valve 178 also supplies a high pressure signal over a line 184 to the pneumatic cylinder 169, which pivotally raises and lowers the mechanical portion of the glob sensing assembly 141 depicted in FIG. 4. It should be noted that both pneumatic cylinders 92 and 169 are of the spring-return type so that when no fluidic control signal is applied to the fluidic-to-pneumatic valve 181, the spring in the cylinder 92 will normally maintain the associated sensor head 81 in an open position, and the spring in the cylinder 169 will normally pivot the mechanical portion of the glob sensing assembly 141 downwardly out of engagement with the normally aligned wire 22.

Assume now that a glob 89 on a given wire 22 causes the wire 156 (depicted in FIG. 4) to be moved pivotally into a vertical up-right position so as to block the air stream normally directed across the recess 159 in the jet sensor 161. This would result in the previously applied output signal in the line 166 being removed from the input port $C_1$ of the inhibited OR gate 176. As such, a signal would be produced at the output port 02 of the latter gate and applied to the control port $C_1$ of te flip-flop 178. This would shift the output of the flip-flop 178 from the previous 02 to the 01 output port thereof, thereby removing a fluidic control signal from the three-way valve 181. As such, that valve would cut off the high pressure control signal previously supplied to the pneumatic cylinders 92 and 169. As a result, the associated sensor head 81 would be opened and the mechanical portion of the glob sensing assembly 141 (FIG. 4) would be pivoted downwardly in reponse to the spring-biased return of the respective pistons in the cylinders 92 and 169.

Any output signal at the port 01 of the flip-flop 178 (indicative of a sensed wire defect) is also applied through an air line 189 to the input control port $C_1$ of an inhibited OR gate 191. At the same time, however, the output signal through the port 02 of the inhibited OR gate 176 is applied over an air line 194 to the inhibiting control port $C_2$ of the gate 191. The latter signal, by overriding any input signal applied at the control port $C_1$, shifts the output signal of the gate 191, at least momentarily, from the 01 to the 02 output port thereof where it exhausts. Under that condition, there is no output signal applied to the input port $C_1$ of a time delay device 197 and, accordingly, no output signal is even momentarily applied from the output port $C_2$ thereof to the control port $C_2$ of the flip-flop 178. The flip-flop 178 thus remains, at least momentarily, with only a defect input signal applied to the input port $C_1$ thereof. This, of course, maintains the valve 181 de-actuated.

After a given glob 89 has been detected by and has passed the glob sensing wire 148 (FIG. 4), the rotatable rod 151 again rotates counterclockwise, to the position depicted, because of the counterweight 154. As a result, the upper leg portion 156a of the jet interrupting wire element 156 is rotated counterclockwise out of the jet stream path (to its solid line position) so as to again establish a fluidic signal that is fed through the air line 166 to the input of the inhibited OR gate 176. This again causes the latter gate to produce an output signal that exhausts through the port 01 thereof. As a result, there again is no signal under normal operating conditions applied to the input control port $C_1$ of the flip-flop 178.

At that point in time, should the flip-flop 178 still be in the operating state that produces an undesired output at the port 01 thereof, the resulting signal applied over the line 189 to the inhibited OR gate 191, in the absence of an inhibiting signal at the control port $C_2$ thereof, will produce an output signal from the port 01. The latter signal is then applied to the input port of the time delay device 197. After a pre-adjusted time delay, such as one to five seconds, for example, an output pulse from the time delay device will be applied to the control port $C_2$ of the flip-flop 178 to thereby re-establish the desired operating state for that device, namely, an output at the port 02 thereof. That fluidic output signal will, in turn, actuate the three-way valve 181 so that high pressure operating signals will again be applied to and actuate the pneumatic cylinders 92 and 169. Actuation of these cylinders, of course, will again effect the closing of the associated sensor head 81 and the raising of the pivotal mechanical portion of the glob sensing assembly 141 to the normal position depicted in FIG. 4. The glob detector circuit 144 (FIG. 6) will thereafter remain in the just described operating state until either another glob 89 is detected on a given wire 22, or the air cylinders 92 and 169 are de-actuated manually.

Manual control of the pneumatic cylinders 92 and 169 is effected by a conventional two position valve 201, which when set at the manual position, applies a fluidic signal from a low level supply source $P_s$ to the inhibiting control port $C_2$ of the gate 176 so as to override the input signal at the control port $C_1$ of that gate. This condition, of course, produces an output signal at the port 02 of the gate 176, and results in an input signal being applied at the control port $C_1$ of the flip-flop 178. The presence of such an input signal, as previously described, results in the three-way valve 181 de-actuating the pneumatic cylinders 92 and 169 until such time that operation in the automated mode is again desired. Automated operation is accomplished by simply switching the two position valve 201 to the automatic position, which results in the flip-flop 178 being reset to the 02 output state after receiving a momentary pulse from the time delay device 197 in the manner described hereinabove.

FAIL-SAFE CIRCUIT

It is desirable to have a fail-safe circuit that allows the pulp coating system to automatically be switched to a manual mode of operation should the fluidic measuring and control system 65 for any reason become inoperative or unreliable, such as caused by a sudden loss in fluidic supply pressure, for example. Such a switch-over is accomplished in accordance with the present invention by utilizing an alarm-actuated fail-safe circuit designated generally by the reference numeral 207 in FIG. 9. As illustrated, this circuit comprises a separate pair of normally closed relay contacts designated NC 209a-f (only four pairs being shown) which are respectively associated with different ones of the six sensor heads 81 employed in the illustrative pulp coating system. These contacts 209, as designated, are normally maintained in a closed position when respectively associated relay coils 213a-f (only four shown) are de-energized.

Each coil 213 is associated with a different alarm indicator assembly, such as 216a depicted in FIG. 8. These assemblies, it will be recalled, are incorporated in the previously identified alarm module 115 depicted in FIG. 7. An alarm indicator, such as a lamp 217a incorporated in the assembly 216a, will be energized whenever the associated sensor head 81 produces a back-pressure control signal that is out-of-limits.

Such a signal, when differentiated in the detector circuit 84, will result in an actuating signal being applied to the control port C of the transfer valve 85 (FIG. 7) which, in turn, supplies a fluidic defect signal through the normally closed port $NC_1$ thereof over a line 221 to the alarm module 115. More specifically, the defect signal is applied to a control port $C_1$ of an associated OR/NOR gate, such as 223a, incorporated as part of the alarm indicator assembly 216a (FIG. 8).

The presence of such a defect signal at the control port $C_1$ of the gate 223a, for example, produces an output signal through the port 02 thereof which fluidically actuates an associated and commercially available single pole-double throw switch designated generally by the numeral 226a. When that switch is actuated, a pivotal switch contact 226a' thereof is shifted from a normally open (NO) position to a normally closed (NC) position. In the latter position, the contact 226a' completes a circuit path from a common positive (+) bias terminal 228 to ground through the parallel connected relay coil 213a and lamp 217a. As such, not only are the coil and lamp energized, but the normally closed contacts 209a (FIG. 9) associated with the relay coil 213a are opened.

With reference still to FIG. 9, it is seen that all six of the relay coils 213a-f (only four being shown) are connected in parallel. Accordingly, the energization of only one of the relay coils 213a-f will result in only one of the circuit paths between a common bus 231 and a common bus 232 of the fail-safe circuit 207 being opened. As such, it is seen that is requires an out-of-limits signal produced by each of the sensor heads 81 simultaneously to open all of the normally closed parallel connections between the two buses 231 and 232. Such a condition would undoubtedly indicate that the fluidic measuring and control system 65 was out of control for some serious reason.

Whenever all of the normally closed contacts 209a-f are simultaneously opened, ac supply power is removed from the electrically operated transfer valve 138. Should this abnormal operating condition arise, the transfer valve 138 will automatically be de-actuated and apply a pre-adjusted standard high pressure control signal (i.e., 3-15 psi) to the pneumatic controller 55b. This will result in a steady-state type of manual control over the amount of pulp metered through the control valve 56 to the vat 43 containing the pulp slurry depicted in FIG. 1.

In situations where it may be desired to manually switch the pulp coating system to the manual mode, there is in addition to he automatic-manual two position control valve 201 depicted in FIG. 6 (that de-actuates both pneumatic cylinders 92 and 169), a normally closed manually operated switch 234 (depicted in FIG. 9) that ensures that the composite fluidic measuring and control system 65 is completely isolated from not only the pneumatic pulp controllers 55a and b, but from control over the normally electrically operated transfer valve 138.

In summary, while the invention has been disclosed in an illustrative application of measuring and controlling the coating thickness on pulp insulated wire, the measuring and averaging units of the composite fluidic system 65, as previously briefly mentioned, may readily be employed in conjunction with the sensing unit in universal applications. More specifically, the unique fluidic sensor heads may be employed to measure many types of elongated articles, even when they may sporadically have abnormal cross-sectional areas thereon, such as cobbles on or joints or splices in rod stock, tubing or bare wire, or knots in multi-strand articles whether made of metal, plastic, rubber or fabric, for example, and whether the strands are disposed in parallel relationship or are twisted or braided.

In addition, it should be appreciated that the various control signals selectively produced in the various operating units of the composite measuring and control system 65 may be employed to perform many diverse work functions in addition to those described herein. For example, the averaged process control signal may be utilized to dynamically adjust such typical coating parameters as the speed at which the wires (or any other type of elongated articles) are drawn through a coating composition, or to control the temperature of the articles and/or coating composition. Similarly, the averaged process control signal, as well as the fluidic sensor head output signals, when out-of-limits, for example, may be employed to stop all or a part of a manufacturing process, or stop a particular monitored production line in a large manufacturing system. The latter functions can also be performed, of course, by a defect signal produced by the upstream article obstruction sensing unit.

In view of the foregoing, it is obvious that various modifications may be made to the present illustrative methods of the invention and system embodiment therefrom, and that a number of alternatives may be provided without departing from the spirit and scope of the invention.

What is claimed is:

1. A method of controlling a geometrical dimension related to coating thickness of each of a plurality of continuously advancing elongated articles, comprising the steps of:

coating said aarticles with a layer of coating material having a thickness that is responsively controlled by at least one adjustable operating parameter;

measuring said geometrical dimension of at least certain ones of said plurality of coated articles fluidically by respectively passing them through different substantially confined and pressurized areas that each establishes a detectable back-pressure in the presence of an article, the magnitude of which back-pressure is correlated with said geometrical dimension of the article passed therethrough;

determining fluidically whether said measured geometrical dimension of each coated article is within a predetermined acceptable tolerance range, and producing a separate process signal having a magnitude correlated with and for every measurement, and whenever any process signal indicative of any measurement is outside said tolerance range, at least momentarily substituting a reference signal representative of a nominal geometrical dimension for any such process signal;

averaging all of said process signals and any reference signals fluidically so as to form a composite control signal representative of the average of at least all of the measured geometrical dimensions that have been found to be within said tolerance range;

utilizing said composite control signal to change at least said one adjustable operating parameter, as required, to maintain said measured geometrical dimension and, thereby, the coating thickness of at least the majority of said articles within said acceptable tolerance range during said coating operation, and sensing each advancing coated article upstream from the point at which it is being measured for any region therealong having an abnormally large cross-sectional area, and in response to such a sensed abnormally large condition, enlarging said confined pressurized area downstream so as to allow said article region having an abnormally large cross-sectional area to freely pass therethrough, and after a pedetermined time delay re-establishing said confined area.

2. A method of controlling the thickness of a coating applied to each of a plurality of continuously advancing elongated articles, comprising the steps of:

passing said elongated articles through a coating station whereat a layer of coating material is applied thereto having a thickness responsively controlled by any one of a plurality of adjustable operating parameters including the percentage concentrations of the various constituents forming the coating composition;

measuring a geometrical dimension related to the coating thickness of at least certain ones of said articles by respectively passing them through different pressurized passageways that each establishes a back-pressure process signal in the presence of an article, the magnitude of which process signal is correlated with said measured geometrical dimension of the coated article passed therethrough;

removing any process signal representative of a measured article geometrical dimension that is outside a predetermined tolerance range, and substituting therefor, at least momentarily, a reference signal having a magnitude representative of a nominal article geometrical dimension for use in establishing an averaged composite control signal;

averaging all of said back-pressure process signals and any reference signals so as to form a composite control signal representative of the average of all of the coated article geometrical dimensions that have been measured;

utilizing said composite control signal to control the flow rate of at least one constituent of the coating composition so as to vary the consistency thereof, as required, to maintain the thickness of the coating on said articles within limits defined by the tolerance range or said measured and related geometrical dimension, and sensing each of said advancing articles upstream from the point at which it is being measured for any region therealong of abnormally large cross-sectional area, and in response to such a sensed abnormally large condition, enlarging said pressurized passageway associated with said article having an abnormally large cross-sectional area so as to allow said article having the abnormally large cross-sectional area to pass therethrough, and after a predetermined time delay, reducing said passageway to its previous measuring size.

3. A method in accordance with claim 2, wherein the elongated coated articles comprise wires coated with wood-based pulp insulation, wherein said measured geometrical dimension comprises the diameter of each of said measured coated wires, and wherein said composite control signal is transformed from a fluidic to a pneumatic control signal for controlling the flow rate of at least said one coating constituent comprising pulp in solution.

4. A method of controlling a geometrical dimension of a plurality of continuously fabricated wood-based pulp coated articles wherein the articles are passed through a pulp slurry so that ribbons of pulp are positioned on and thereafter formed about said articles in the form of coatings thereon, and wherein the pulp slurry is replenished and the consistency thereof adjustably controlled by flowing a pulp solution of a predetermined consistency and at a controllable rate into the slurry, characterized by the steps of:
measuring said geometrical dimension of at least certain pre-selected ones of said coated articles by respectively passing them through different substantially confined and pressurized areas that each establishes a detectable back-pressure in the presence of an article, the magnitude of which back-pressure is correlated with said measured geometrical dimension of the pulp-coated article passed therethrough, and producing a process signal for each measurement, the magnitude of which signal is correlated with said geometrical dimension of each measured article;
averaging all of said process signals so as to form a composite process control signal representative of the average of all of the geometrical dimensions that have been measured, and removing any process signal representative of a measured geometrical dimension of an article that is outside a predetermined tolerance range, and substituting therefor, at least momentarily, a reference signal having a magnitude representative of a desired geometrical dimension for use in establishing said averaged process control signal;
utilizing the process control signal to control the flow rate of the pulp solution supplied to the pulp slurry so as to vary the consistency thereof, as required, and thereby control the ultimate geometrical dimensions of the coated articles, and
sensing each advancing pulp insulated article upstream from the point at which it is being measured for any region therealong having an abnormally large cross-sectional area, and in response to such a sensed abnormally large condition, opening said confined pressurized area so as to allow said article region having an abnormally large cross-sectional area to freely pass therethrough.

5. A method in accordance with claim 4 wherein said geometrical dimension is related to the cross-sectional area of each measured article, and wherein said cross-sectional area is measured and averaged fluidically.

6. A method in accordance with claim 4 wherein each of said coated articles comprises a pulp insulated wire, and wherein said geometrical dimension is the diameter of each coated wire, and is measured by passing said wire through a restricted passageway of a fluidic sensor head.

7. A method in accordance with claim 6 further including the step of:
closing any sensor head after it has been opened in response to a sensed wire region of abnormally large cross-sectional area, after a predetermined time delay.

8. A method in accordance with claim 6 further including the step of:
substituting a standard process control signal for the averaged composite process control signal to control the amount of pulp supplied to said pulp slurry whenever all of the measured wire diameters are determined to be outside said predetermined tolerance range prior to the step of averaging said signals.

9. A method of monitoring the geometrical dimension of an elongated, continuously advancing article, comprising the steps of:
passing the article through a substantially confined and pressurized area that establishes a detectable back-pressure signal in the presence of an article, the magnitude of which signal is correlated with said geometrical dimension;
determining whether the geometrical dimension of said article, as determined by the magnitude of the back-pressure signal, is within a predetermined acceptable tolerance range, and producing an alarm signal indicative of an article having an abnormally large cross-sectional area, and
sensing upstream of the confined area for any region along the article of abnormally large cross-sectional area, and in response to such a condition, enlarging said confined area, at least momentarily, so as to allow said article having an abnormally large cross-sectional area to pass therethrough, and with an alarm signal being produced as a result of said sensed abnormally large cross-sectional area.

10. A method in accordance with claim 9 wherein a plurality of elongated articles are simultaneously measured within separate pressurized areas, and are simultaneously sensed upstream therefrom for article regions of abnormally large cross-sectional area.

11. A method in accordance with claim 10 wherein each of said articles comprises elongated metal stock, said measured geometrical dimension comprises the cross-sectional area of each metal stock, and said sensed regions of abnormally large cross-sectional area comprise cobbles.

12. A method in accordance with claim 10 wherein said articles comprise elongated, insulated wires, said measured geometrical dimension comprises the diameter of each insulated wire, and said sensed regions of abnormally large cross-sectional area comprise globs of insulation.

13. A method in accordance with claim 2 further including the step of:
substituting a standard reference signal for said composite control signal to control said flow rate whenever the magnitudes of all of said back-pressure process signals derived from the measuring step are indicative of measured article geometrical dimensions that are outside said predetermined tolerance range.

* * * * *